US006376560B1

(12) United States Patent
Ogura et al.

(10) Patent No.: US 6,376,560 B1
(45) Date of Patent: Apr. 23, 2002

(54) INK FOLLOWER FOR WATER-BASE BALLPOINT PENS AND METHOD OF MANUFACTURING THE SAME

(75) Inventors: Norio Ogura; Youji Takeuchi; Kiyoshi Iwamoto; Tadashi Kamagata; Katsuhiko Shiraishi, all of Yokohama (JP)

(73) Assignee: Mitsubishi Pencil Kabushikikaisha, Tokyo (JP)

( * ) Notice: Subject to any disclaimer, the term of this patent is extended or adjusted under 35 U.S.C. 154(b) by 0 days.

(21) Appl. No.: 09/463,716

(22) PCT Filed: Jul. 31, 1998

(86) PCT No.: PCT/JP98/03432

§ 371 Date: Apr. 7, 2000

§ 102(e) Date: Apr. 7, 2000

(87) PCT Pub. No.: WO99/06223

PCT Pub. Date: Feb. 11, 1999

(30) Foreign Application Priority Data

Jul. 31, 1997 (JP) ........................................ 9-206230
Jul. 31, 1997 (JP) ........................................ 9-206231

(51) Int. Cl.[7] ........................ B01J 13/00; B01D 19/00; B43K 7/08

(52) U.S. Cl. ...................... 516/100; 137/205; 252/381; 252/383; 401/217; 422/43; 516/99; 516/101; 516/112; 516/195

(58) Field of Search ........................ 516/99, 100, 101, 516/195, 112; 422/43; 137/205; 401/217; 252/381, 383

(56) References Cited

U.S. PATENT DOCUMENTS

| | | | | | |
|---|---|---|---|---|---|
| 2,502,102 | A | * | 3/1950 | Peters | 137/205 X |
| 2,732,829 | A | * | 1/1956 | Fehling | 401/217 |
| 4,475,950 | A | * | 10/1984 | Finlayson | 516/100 X |
| 4,690,775 | A | * | 9/1987 | Schott et al. | 516/99 X |
| 5,075,033 | A | * | 12/1991 | Cody et al. | 516/101 X |
| 6,010,269 | A | * | 1/2000 | Yokosuka et al. | 401/217 |

FOREIGN PATENT DOCUMENTS

| | | |
|---|---|---|
| JP | 5-270192 | 10/1993 |
| JP | 6-336584 | 12/1994 |
| JP | 7-61187 | 3/1995 |
| JP | 8-41411 | 2/1996 |
| JP | 8-52982 | 2/1996 |

* cited by examiner

*Primary Examiner*—Richard D. Lovering
(74) *Attorney, Agent, or Firm*—Kubovcik & Kubovcik

(57) ABSTRACT

This invention relates to ink follower for a water-base ballpoint pen with its bubbles removed, time-dependent stability, less oil separation, and greatly reduced lot-to-lot viscosity difference and associated performance difference, and a method for manufacturing the same. After addition of thickener, the follower is made depressurized preferably at 0.2 atm or lower. Simultaneous heating and stirring are preferable. When the ink follower is solely debubbled in advance, fine bubbles contained in particulate silica, clay thickener, etc. can be very highly removed even if the centrifugal debubbling is not so strong and there is no bad affection to the writing property of the pen. It is also possible that, after adding the thickener, a centrifugal force greater than or equal to 200-fold of the gravitational acceleration is applied to debubble.

21 Claims, 1 Drawing Sheet

INK FOLLOWER FOR WATER-BASE BALLPOINT PENS AND METHOD OF MANUFACTURING THE SAME

This application is a 371 of PCT/JP98/03432 filed Jul. 31, 1998.

TECHNICAL FIELD

The present invention relates to ink follower, which follows water-base ink filled in an ink reservoir of a ballpoint pen, and also to a method for manufacturing the same.

BACKGROUND ART

The ink for a water-base ballpoint pen has a viscosity of as low as 50 mPa sec to 3 Pa sec, while the ink for an oil-base ballpoint pen, though it has a similar structure to a water-base one, has a viscosity of 3 to 20 Pa sec. Consequently, the ink filled in a water-base ballpoint pen may leak out when the pen is left upward or sideways. Moreover, even a small impact made on the pen may cause its ink to scatter and to stain the hand or the clothes.

There have been conventional arts for a water-base ballpoint pen with its ink in its ink reservoir that it is equipped with an ink follower composed of a gelled material, or a mixture of the gelled material and solid material. The aims of the arts are to make the ink follower follow the ink smoothly, to make the pen endure an impact when dropped, to prevent the ink from back flow, to give the pen a good appearance, and so on. A common feature of such arts is that the ink follower, which has pseudo-plasticity, is made from hardly-volatile or non-volatile solvent which is supplemented with some kind of thickener in order that the ink follower may not flow backward when the pen is left sideways or upward.

Moreover, conventional ink follower for water-base ballpoint pens often has very low viscosity and tenacity, as compared with that for conventional oil-base ballpoint pens, which often has equal viscosity to common grease used for lubricant.

About as much as 50 to 300 mg of ink is required for writing a line of 100 m in length by a water-base ballpoint pen holding the ink in the ink reservoir, while only 10 to 30 mg of ink is required by an oil-base ballpoint pen. Thus, the ink follower for the water-base ballpoint pens is required to have a strict ink-following performance, and is, therefore, mainly of low viscosity.

Lubricant grease with low viscosity and consistency generally has such low stability that oily matter likely separates when left to stand. In addition, the high mobility of thickener in the lubricant grease is likely to cause the grease to lose homogeneity easily by forming a mixture of coarse and dense portions.

The lower the viscosity of the thickener of the grease is, the less effectively the thickener is dispersed by a disperser such as a double-roll mill, a triple-roll mill, a kneader or a planetary mixer, any one of which is suitable for substances with high viscosity. The thickener is, however, not so low in viscosity as to be capable of being mixed effectively by a disperser such as a bead mill, a sand mill or a homogenizer, any one of which is suitable for substances with low viscosity. Inefficient dispersion causes not only time-dependent instability but also lot-to-lot instability in viscosity and uniformity.

The ink follower for the water-base ballpoint pens consists of materials similar to the lubricant grease, and exhibits time-dependent behaviors based on similar physical laws. However, if the oily matter separates from ink follower, it affects writing adversely by reacting with surfactant in the ink, or by forming oil droplets which block the ink passage.

Moreover, ink follower lacking homogeneity is separated into a portion following the ink and portions adhering to the inner wall of the ink reservoir. The adhering portions not only give the pen an unpleasant appearance, but also mean a corresponding loss of the ink follower, resulting eventually in its failure to perform its function of, for example, preventing the ink from volatilizing or from leaking.

The lubricant grease and the known ink follower have a common defect, too.

When they are used as ink follower in a water-base ballpoint pen which holds the ink in a cylindrical or similarly shaped ink reservoir with an inside diameter of 2.5 mm or larger, bubbles often occur between the ink and the ink follower by the passage of time. Moreover, bubbles or cracks, which have not seen initially, often occur in the ink follower (or the lubricant grease used as a substitute therefor). Since ink follower is nearly liquid rather than semi-solid, it is very questionable whether an expression of "cracks" is appropriate, but the greasy matter is cracked in appearance. We, the inventors of the present invention, call these phenomena "bubbling". Once the bubbles occur between the ink and the ink follower, it grows larger and interrupts the contact between the ink and the ink follower. Then, the ink follower is urged by the vapor pressure of the ink toward the tail end of the pen, and eventually falls off. The ink follower having cracks or the like loses its function of keeping the ink from contact with the air.

These phenomena are presumably due to the invisibly fine bubbles that may exist in the ink follower or lubricant grease when manufactured. The bubbles gather with the passage of time, and tend to escape from the pen.

The bubbling is a serious defect in this kind of water-base ballpoint pen.

Commercially available ballpoint pens are subjected to a strong centrifugal force for debubbling. Debubbling by a strong centrifugal force is, however, not always effective for removing invisibly fine bubbles, but can only reduce the percentage of bubbling to about 1/5 to 1/20.

Moreover, the centrifuging is not a suitable method for debubbling for pens with a pigment ink, particularly the ink containing a pigment with a true specific gravity of 4 or higher, since a strong centrifugal force promotes the sedimentation of the pigment.

Thus, in order to prevent the contamination of fine bubbles in advance, conventional centrifugal debubbling when the pens are assembled may be carried out strongly. However, too strong centrifugal debubbling causes defects such as deformation of pen point or the connecting part of the ballpoint pen. Further, it may sometimes happen that the pigment in the ink is sedimented and clogs at the pen point resulting in poor writing and that is significant when pigment of a high specific gravity such as titanium oxide and metal powder is contained in the ink.

The objects of this invention are to dissolve the defect that conventional ink follower for a water-base ballpoint pen has lot-to-lot and time-dependent instability of quality, and to provide ink follower which has time-dependent stable performance for mass-production and a method for manufacturing thereof.

The other object of the present invention is to provide a method for manufacturing the ink follower by which the time-dependent growth of bubbles, which is a defect of conventional ink follower for water-base ballpoint pens, is dissolved, without any above-mentioned bad influence upon the ballpoint pens caused by a strong centrifugal force after filling the ink and the ink follower into a ballpoint pen holder.

DISCLOSURE OF THE INVENTION

As a result of our diligent study of above problems, we have found that, by homogenizing particulate silica, clay thickener, metal soap, or organic thickener microscopically highly, the thickener constantly exhibits its best performance. And we have also found that the ink follower, therefore, showed more time-dependent stability and less lot-to-lot instability. Thus we have completed our present invention.

Moreover, as a result of diligent study of above problems, we found that conventional centrifugal debubbling during the assembly of ballpoint pens, which is said to be an essential process, is not so strong when centrifugal debubbling upon ink follower of water-base ballpoint pens is previously performed. Upon this knowledge, we have found some conditions that the invisible fine bubbles contained in particulate silica, clay thickener, metal soap and organic thickener can be highly removed microscopically without any bad influences on writing property of the pens, and thus we have accomplished the present invention.

Lubricant grease and ink follower for a water-base ballpoint pen are prepared from similar materials by similar processes, but are clearly different from each other from a technical standpoint.

The lubricant grease is usually used for lubricating, and is, therefore, made to have high structural viscosity and yield value lest the oily constituent of the grease drip from a point where the grease is applied. On the other hand, the age ink follower for a water-base ballpoint pen is held in a reservoir with no opening except its rear end, and is used in an environment in which there is no sliding matter except itself. Therefore, the structural viscosity and yield value of the ink follower may be low. It would rather be correct to say that it is necessary for the ink follower to be low in structural viscosity and yield value in order to follow the ink smoothly.

Fine particulate powder such as inorganic thickener (particulate silica, alumina or titanium dioxide), inorganic or organic pigment and fine resin particulate, which gains structural viscosity in liquid, generally shows a lower thickening effect and a lower yield value when it is well-dispersed.

Clay thickener and organic thickener, which exhibit thickening effect by swelling with a solvent, tend to show a lower yield value when they are well-dispersed in liquid. So does metal soap.

Although the thickener of the ink follower, such as particulate thickener and clay thickener, appears to be thoroughly wet with the solvent, microscopically small bubbles exist in the core of the particle of the thickener because of its thickening effect that prevents the solvent from permeating thoroughly to its core. This is evident from the fact that the grease or, the ink follower, though it appears bubble-free, produces a large number of bubbles under reduced pressure at much lower temperature than the boiling point of its oily constituent. So does metal soap thickener that seems to have, being prepared at high temperature, an advantage in permeability of the oily constituent.

In the present invention, we have improved the wetting of every particle of the thickener with solvent and caused the thickener to always exhibit its ability to its maximum degree. Thus we have given the ink follower stability in lot-to-lot viscoelasticity and performance. Moreover, the thickener being homogenized, we have successfully obtained ink follower for a water-base ballpoint pen with very good time-dependent stability. This invention relates to a method of manufacturing such follower under the conditions that satisfy above requirements.

The solvent used as the base oil for the ink follower is selected from polybutenes with a molecular weight of 500 to 3000, liquid paraffin, mineral oil such as spindle oil, silicone oil and so on. They do not dissolve in a water-base ink, and have only a small volatile loss. They generally have a better wetting property with resins, such as polypropylene, polyethylene and so on, used for an ink reservoir than that of water-base ink. Thus the consumption of the ink is easy to recognize.

Polybutenes and silicone oils, though some kinds of them are highly volatile, can withstand for two years or more at room temperature if their volatile loss is not more than about 0.2% by weight under a JIS C-2320 method at 98° C. for five hours.

The volatility of polybutenes largely depends upon their molecular weight. Polybutenes with average molecular weight more than about 500 may satisfy the above volatile loss.

Since the volatile loss of silicone oils also depends upon their molecular structure, it cannot be determined only by their molecular weight. Therefore, the volatile loss of silicone oils is recommended to be measured practically by the method as described above.

The thickener used for the present invention is preferably hydrophobic or insoluble. Hydrophilic thickener sometimes migrates into the ink through the surface between them. As a result, the ink follower loses of its viscosity, and the ink suffers an ill effect of being unable to write. However, hydrophilic thickener can be used if appropriate measures such as, for example, water-repelling treatment made to the thickener or the ink follower and the ink composition hard to be affected by the thickener are taken.

Preferred examples of the thickener are:

- particulate silica with methylated surfaces such as Aerozyl R-972, R-974D, R-976D and RY-200 (Nippon Aerozyl Co., Ltd.),
- organic thickener such as Leopar KE (Chiba Powder Manufacturing Co., Ltd.),
- clay thickener, which has hydrophobized surfaces by onium treatment, such as dimethyldioctadecyl ammonium bentonite, and
- insoluble metal soap such as lithium stearate, aluminum stearate and sodium stearate.

Each of above substances may be used alone, or may be used in combination with others. The total amount of thickener is preferably from 1 to 10% by weight of the ink follower.

Hydrophilic thickener, such as Aerozyl #200, 380, 300, 100 and OX50 (Nippon Aerozyl Co., Ltd.), particulate alumina and ultra-particulate titanium dioxide, can be prevented from interfering with the ink when the ink follower contains the substances such as surfactant, silane coupling agent, fluorocarbon, and methylhydrogen silicone, each of which has a hydrophilic-lipophilic balance (HLB) value of less than 4, preferably of less than 2. When silicone oil is used the for base oil of the ink follower, it is often possible for the ink follower, without adding other substance, to avoid interfering with the ink.

It is effective to use an additive such as a surfactant to the ink follower in order to improve its property of following the ink. Even irrespective of the kind of surfactant, it is not preferable to use the surfactant that dissolves in the ink during storage, but is preferable to use nonionic surfactant with an HLB (hydrophile-lipophile balance) value less than 4. Moreover, the so-called fluorine-surfactant and silicone-surfactant are the most preferable additives for the present invention, in which the microscopic fine bubbles are eliminated by wetting the thickener thoroughly by pressure bubbling, since they can drastically lower the surface tension of the base oil.

It is also preferable for the object of this invention to add above-mentioned silane coupling agent, methylhydrogen silicone, etc. since they are effective for stabilization of the dispersion of the thickener, homogenization and hydrophobization. It is very preferable to use additives unless it makes an ill effect for the stability of the ink follower and for the quality of the ink.

The amount of these additives to be used is generally from 0.01%, which is minimal effective concentration, to about 5% by weight. The amount over 5% by weight does not produce any better result, though it may not present any problem in quality.

Since the present invention includes a method for manufacturing, it will be illustrated in detail by way of Examples. Conceptionally, it is based upon the idea that the invisible bubbles in the gelly substance or, more specifically, in the thickener are swollen under depressurization and eliminated from the system. It is also based upon the idea that the surface tension of the solvent is reduced by raising the temperature so that even the invisible fine bubbles are wetted.

It goes without saying that stirring results in better efficiency both under depressurization and under heating. Moreover, far better results are available when depressurization, heating and stirring are carried out at a time although it is better that the temperature is not so high when strongly depressurized at 0.1 atm or lower. A rough aim is around 60° C.

Although ink follower containing fewer bubbles is prepared when a double-roll mill or a triple-roll mill is used at high temperature, it should be subjected to a final debubbling under depressurization by transferring it to a stirrer such as a kneader and a planetary mixer capable of depressurizing and heating.

Probable examples for the methods of debubbling are;

to eliminate the bubbles, which are swollen under reduced pressure, by spraying at least one kind of substance such as water, organic solvent such as alcohol and surfactant such as anti-bubbling agent; and to mix bubble-breaking agent previously.

These methods may, however, leave the matter sprayed to the ink follower or the component irrelevant to the property of the ink follower. Therefore, debubbling by depressurization in which no additives are used is preferred.

Depressurization must be done under 0.2 atm or lower. The value of 0.2 atm is a result of experiences by the present inventors and we have no scientific explanation for that. Since we have intentionally used hardly-volatile solvent, we have not experienced the boiling even at a low pressure under the temperature less than or equal to 60° C. The bubbles are not sufficiently eliminated at 0.2 atm or higher even in the state at high temperature in which the viscosity lowers.

The lower limit of the pressure should be low enough for the base oil not to boil. The present inventors are sure that lower pressure will cause a better result that the bubbles are well eliminated. However, any kind of hardly-volatile solvent will no longer exist in absolute vacuum. In addition, many of non-volatile and hardly-volatile solvents are in a state of a mixture of substances having different molecular weights and different positions of double bond and cyclic moiety. Therefore, some of them partly evaporate at high temperature and low pressure.

In the case of polybutene for example, what is usually called a molecular weight is an average and the polybutene is an aggregate of polybutenes having the molecular weights near the average value. When such polybutene is exposed at high temperature and low pressure, components having lower molecular weight are lost.

Quality control for each manufacture lot is apt to be dominated by the lot-to-lot difference of polybutene, but, since the components which are easily evaporated are firstly lost, time-dependent stability is rather good.

The present invention is also effective to a method where the substance dispersed keeping high viscosity is later diluted with solvent or the like. For example, while a triple-roll mill is used in the case of a compound in the Example 1 of the present invention, the same efficiency can be achieved without the use of the triple-roll mill according to a manufacturing method of the present invention in which the materials are well kneaded by a planetary mixer until the step for the triple-roll mill, added with mineral oil and stirred with heating at around 100° C., and then adjusted to the temperature at 60° C. or lower using cooling water or the like to debubble by depressurization. In order to disperse more efficiently, it is recommended to knead under depressurization prior to addition of the mineral oil or to knead after raising the temperature.

An example for a method of filling the ink follower of the present invention is that ink is filled in an ink reservoir, a pen point is attached and then ink follower is charged. After that, a strong centrifugal force is applied by means of a centrifugal separator in the direction from the tail end to the pen point whereby the ink follower is filled with a good appearance containing no air or the like between the ink and the ink follower.

In the case of the ink follower according to claims 19 to 21, a centrifugal force of 200·g (where g is a gravitational acceleration) is applied so that the ink follower is previously debubbled.

Regardless of water-base or oil-base ballpoint pens, the ballpoint pens where the ink is directly filled in an ink reservoir have conventionally applied a centrifugal force in order to debubble and to push the ink forward to the pen point. The object of this debubbling is to mechanically eliminate the bubbles existing between the pen point and the tail end of the ink reservoir, and the object is also to remove the visible large bubbles.

As compared with the centrifugal force applied to the pen point at that time, the value of 200·g seems to be too small even for the present inventors but it should be noted that the said centrifugal force is not that which is applied to the tip of the ballpoint pen but that which is applied to ink follower itself.

In the present invention, an object is to remove fine bubbles and, therefore, a strong centrifugal force is necessary. The above-mentioned conventional centrifugal force applied to a ballpoint pen in its manufacture is as strong as 1000·g or even more than 2000·g at the pen point, while it seldom reaches 200·g at the rear part of ballpoint pen holder where the ink follower is present since the radius from the center of the centrifugal separator is short.

Strong centrifugation has conventionally been applied to this kind of water-base ballpoint pens. The condition "at 2800 rpm for 10 minutes using a centrifugal separator of type H-103N by Kokusan Enshinki" mentioned in the conventional patent specifications is very strong as an assembling step for a ballpoint pen and the tip of the ballpoint pen is protected by a special tool working as a buffer. In the machine where the effective orbit radius of the tip of the pen when this buffer tool is used is 15 cm, the tail end of the ink follower is at the position of 2–2.5 cm from the center of the centrifugal separator and, as a result of calculation, a centrifugal force around 200·g is applied.

At that time, we the present inventors were worrying about the time-dependent contamination of bubbles in a water-base ballpoint pen and in the ink follower but, from various experiences, we have found its causes and the countermeasure for that, and have achieved the present invention.

From various experiences, we the present inventors have found that the minimum centrifugal force for removing the fine bubbles in the ink follower filled in the holder of the ballpoint pen is 200·g as a centrifugal force to the center of gravity of the ink follower while the sufficient centrifugal force is about 350·g. When 350·g is applied as a centrifugal force for removing the fine bubbles in the ink follower in the holder, the cracks or the like did not occur in the ink follower due to the bubbles. From our further experiences, it has been found that, when the centrifugal force exceeds 700·g, no bubble occurred even at the interface between the ink and the ink follower. However, such a centrifugal force is used too much, ill effects are resulted.

Needless to say, the present invention relates to a part of the art for ballpoint pens and, therefore, it is an object to manufacture ballpoint pens having a good property as a whole Therefore, in order to apply a strong centrifugal force to the ink follower located at the tail end area of the ballpoint pen, several-fold of the centrifugal force is imposed on the tip of the ballpoint pen and, as a result, the tip and the connecting part are physically deformed.

Further, when heavy pigment of the true specific gravity greater than 4 or pigment such as pearl or metal powder whose particle size is unable to make small is used, a strong centrifugal force should not be applied to the pen as a whole. Accordingly, it is important to make sure how much centrifugal force is applied to achieve this effect.

A strong centrifugal force is not to be applied upon assembling the ballpoint pen in order to prevent the deformation of the tip or the connecting part between the tip and the ink reservoir of the ballpoint pen or to prevent the sedimentation of the pigment in the ink.

An idea of the present invention is that a strong centrifugal force is applied to the ink follower itself whereby the fine bubbles are previously removed. In that case, it is suggested to apply a centrifugal force of 200·g or, preferably, 350·g or not less than 700·g.

However, that may cause separation of oil or unbalanced viscosity in the case of the ink follower whose fluidity is of big account. In that case, the centrifugal force applied to the ink follower should be as small as possible but it should be, as mentioned above, at least 200·g.

Both of the centrifugal force applied to centrifugally debubble the ink follower only and that applied to the ballpoint pen are fundamentally the same since both of them aim to eliminate the fine bubbles.

Namely, the said force is at least 200·g and, in order not to result in cracks in the ink follower, it is 350·g or, preferably, 700·g.

The difference from the case where debubbling is carried out after assembling the ballpoint pen is that, even a weak centrifugal force applied for a long time is effective.

The total centrifugal force when the time for application is taken into consideration is therefore the total energy applied thereto.

It may be said that sedimentation of the pigment of the ink is more strongly affected by such a total centrifugal force rather than by the strength of the temporary centrifugal force. That is simply considered as a problem of sedimentation since the pigment in the ink is almost wetted by its vehicle and that is a relation between the pigment (and the dispersing agent thereof) and other liquid components (and the dissolved thing therein) in the ink. The sedimented amount of the pigment is almost correlated to the product of time and gravitational acceleration.

On the other hand, the wetting of the fine particles or the clay thickener to the base oil of the ink follower is not so good as noted in the relation between the vehicle and the pigment in the ink whereby the bubbles are present. Accordingly, it is necessary to eliminate the bubbles adsorbed with the solid and the ones unable to come out due to physical hindrance. So that is not a simple problem of sedimentation. In order to release the adsorbed fine bubbles and also the bubbles due to a physical hindrance, an absolute power of force is necessary.

Therefore, in the case of conducting a centrifugal operation for the ink and for the ink follower at a time, it has been believed to be ideal to apply a strong centrifugal force in a short time.

When a centrifugal force is applied to the ink follower only, it is not necessary to think of the sedimentation of the pigment and, therefore, there is no necessity of too much anxiety about the total centrifugal force. When a centrifugal force is applied for a long time whereby the thickener is well wetted, then the fine bubbles are eliminated at a time.

However, the absolute power of the centrifugal force as mentioned above is still necessary. Even when too weak gravitational acceleration is applied for a long time, the fine bubbles are still adsorbed with the thickener or shut up therein due to a physical hindrance and are unable to be removed.

The turning point of the centrifugal force whether it is sufficient or insufficient is 200·g.

The reason why the minimum value which is effective in the case of assembling a ballpoint pen holder is also 200·g is that the fine bubbles adsorbed with the thickener or enclosed therein due to a physical hindrance are removed and, therefore, their physical behavior is presumed to be the same.

When a centrifugal force is applied to a ballpoint pen holder, the time for application is usually 5–10 minutes or shorter and at most 30 minutes. The above-mentioned finding is also based upon the test result carried out for the time within this range. When the time is longer than 30 minutes, poor writing probably due to sedimentation of the pigment may be noted that even in the case of pigment ink having a good dispersibility is used.

When only ink follower is centrifuged, the debubbling effect in a short time is the same as the case where it is debubbled together with the ballpoint pen holder while, when debubbled for a long time, an advantageous result in terms of bubbling is obtained.

The definition for "a long time" will be as follows. Thus, since ink follower is made of substance which is neither evaporated nor oxidized even when exposed to air at least for 2–3 years in the ballpoint pen holder, centrifugation may be theoretically applied for 2–3 years but, practically, the term "a long time" is from one hour to around one day. That is because application of a centrifugal force for a longer time than that will be meaningless and, in addition, separation of oil is resulted due to sedimentation of the thickener itself.

BEST MODE FOR CARRYING OUT THE INVENTION

Figure 1:
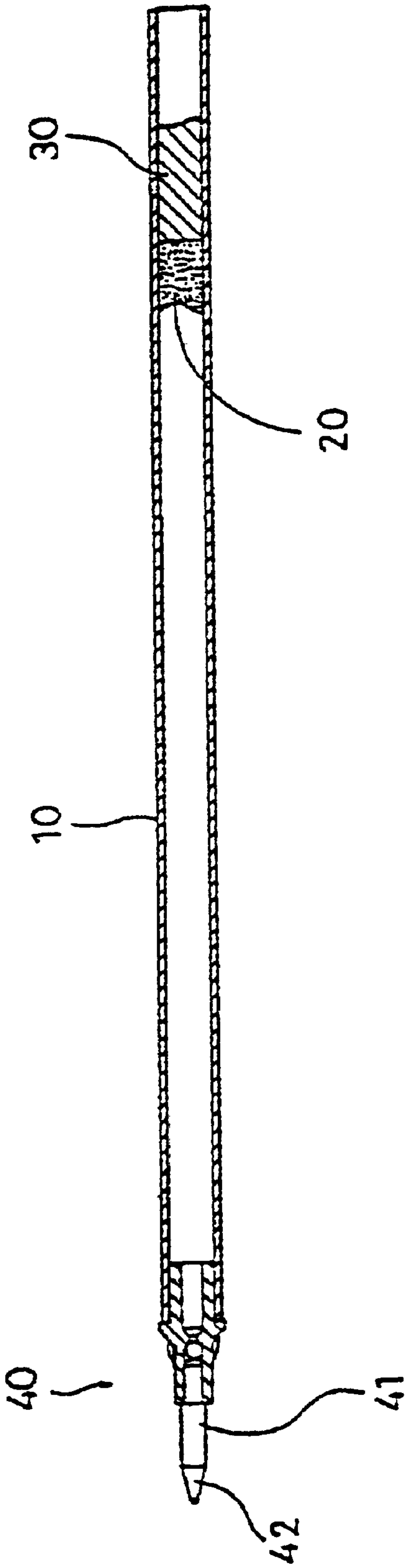
FIG. 1 is a partial cross-section showing a holder of a water-base ballpoint pen using the ink follower of the present invention.

The invention mentioned in claims 1–18 will be further illustrated by way of Examples and Comparative Examples.

For the assembly of the ballpoint pen used in Test 3 and Test 4, a centrifugal separator of type H-103N manufactured by Kokusan Enshinki Co., Ltd. was used and a centrifugal force was applied at 2800 rpm for 10 minutes so as to apply the centrifugal force in a direction of from the tail end of the pen to the pen tip whereby the bubbles contaminated inside are eliminated.

The ink for a water-base ballpoint pen for Test 3 and Test 4 was prepared as follows.

| | |
|---|---|
| Printex 25 (Carbon black; trade name of Degussa) | 7 parts by weight |
| PVP K-30 (Polyvinylpyrrolidone; manufactured by GAF) | 3.5 parts by weight |
| Glycerol | 10 parts by weight |
| Potassium ricinolate | 0.5 part by weight |
| Triethanolamine | 1 part by weight |
| 1,2-Benzisothiazolin-3-one | 0.2 part by weight |
| Benzotriazole | 0.2 part by weight |
| Water | 27.2 parts by weight |

The above components were kneaded by a bead mill. After that, coarse particles of carbon black were removed and then

| | |
|---|---|
| Propylene glycol | 20 parts by weight |
| Carbopol 940 (Polyacrylic acid of a cross-linked type; trade name of B. F. Goodrich) | 0.4 part by weight |
| and | |
| Water | 30 parts by weight |

were added thereto. Finally, ink having a viscosity of 500 mPa sec at 40 $sec^{-1}$ for a water-base ballpoint pen was prepared.

Each five lots of Examples 1–5 and Comparative Example 1–5 were prepared using the same material lot.

Test 1. Viscosity Difference

Viscosity of the ink follower of the Examples and the Comparative Examples was measured. The viscosity was expressed as a ratio (in terms of %) of the maximum value to the minimum value among the five values of viscosity which was measured for one rotation at a cone angle of 3° using a viscometer of type E. The less the value is (the nearer to 100 the value is), the smaller the difference is.

Test 2. Time-Dependent Stability-1 (Oil Separation Test)

Each five lots of the product of the Examples and the Comparative Examples were placed into a level of a one-liter beaker made of stainless steel paying care so that no conspicuous bubbles were generated, a hole corresponding to the size of a ball for table tennis was bored, the beaker was allowed to stand in a water bath of 50° C. for one week and the amount of the oil coming out from the hole was measured.

Result of the evaluation was that ○ for about 1 cc or less (less than 1.5 cc); Δ for about 2–3 cc (from 1.5 cc to less than 3.5 cc); and × for about 4 cc (3.5 cc or more). The points were assigned in such a manner that zero point for ○, three points for Δ and five points for × and the total points for the five lots were adopted as the result for each Example or Comparative Example. The less the point is, the better the result is.

Test 3. Time-Dependent Stability-2 (Test for Preservation of the Ballpoint Pen)

Ten ballpoint pens were assembled for each of the five lots of the products of the Examples and the Comparative Examples using holders as shown in FIG. 1.

A semi-transparent polypropylene tube having an inner diameter of 4.0 mm was used as an ink reservoir (10) and ink (20) and ink follower (30) of each of the Examples and the Comparative Examples were filled therein. The pen point (40) was equipped with a ball pen tip which was the same as that for a commercially available ballpoint pen (UM-100; trade name of Mitsubishi Pencil Co., Ltd.) using the holder having the same shape as shown in FIG. 1. The material for the ballpoint pen tip holder (41) was a free-cutting stainless steel while the ball (42) was made of a tungsten carbide having a diameter of 0.5 mm.

The assembled ballpoint pen was allowed to stand in a water bath of 50° C. for one month in such a state that the pen point was left upward and the numbers of the pens in which the oil was mixed with the ink were counted visually and were used as the points. There were ten pens for each lot and there were five lots for each Example or Comparative Example and, therefore, each Example or Comparative Example consisted of fifty samples whereby zero point was the best while fifty points was the worst.

Test 4. Time-Dependent Stability-3 (Bubbling Test)

The assembled ballpoint pens were allowed to stand in a water bath of 50° C. for one month in such a state that the pen point was left downward and the numbers of the pens in which the bubbles were present at the interface between the ink and the ink follower or in which cracks or the like were found in the ink follower were counted visually and used as the points. When bubbles or cracks or the like were found either in the ink or in the ink follower, that was counted as a rejected article. There were ten pens for each lot and there were five lots for each Example or Comparative Example and, therefore, each Example and Comparative Example consisted of fifty samples whereby zero point was the best while fifty points was the worst.

Test 5. Time-Dependent Stability-4 (Writing Test after Preservation)

The samples per se after subjected to the evaluation in the Test 3 were used for spiral writing at the rate of 4.5 m/sec. Numbers of the pens unable to write in spite of remaining of the ink at the length of 1 cm (about 0.13 g) or more in the tube were counted and used as the point. As well as in Test 3, zero point was the best while fifty points was the worst.

EXAMPLE 1

| | |
|---|---|
| Polybutene 35R (trade name of Idemitsu Kosan Co., Ltd.; MW = 720) | 47.4 parts by weight |
| Aerozyl R-976D (hydrophobic silica; trade name of Nippon Aerozyl Co., Ltd.) | 5 parts by weight |

-continued

| | |
|---|---|
| Eftop EF-801 (fluorine surfactant; trade name of Mitsubishi Materials Co., Ltd.) | 0.1 part by weight |
| Diana process oil MC-S32 (mineral oil; trade name of Idemitsu Kosan Co., Ltd.) | 47.5 parts by weight |

The above components were weighed, stirred at 70° C. for 1 hour using a planetary mixer (type 5DMV; manufactured by Dalton Co., Ltd.) and then stirred for 1 hour at 40° C. at 0.2 atm to give a product of Example 1.

EXAMPLE 2

| | |
|---|---|
| Nissan polybutene 015N (trade name of NOF Corporation; MW = 580) | 95 parts by weight |
| Benton 34 (organically-treated bentonite; trade name of Wilber-Ellis) | 4 parts by weight |
| KBM 504 (silane coupling agent; trade name of Shin-Etsu Chemical Co., Ltd.) | 1 part by weight |
| Methanol | 2 parts by weight |

The above compounded substance was kneaded twice using a triple-roll mill (manufactured by Kodaira Seisakusho Co., Ltd.; roll diameter: 13 cm).

During the kneading in the triple-roll mixer, methanol was evaporated and lost. After that, the mixture was transferred to an agi-homomixer (type HM-2P; manufactured by Tokushu Kika Co., Ltd.) and stirred at 50° C. for 1 hour at 0.02 atm to give a product of Example 2.

EXAMPLE 3

| | |
|---|---|
| Nissan polybutene 200SH (trade name of NOF Corporation; MW = 2650) | 48.4 parts by weight |
| Aerozyl R-972 (hydrophobic silica; trade name of Nippon Aerozyl Co., Ltd.; BET surface area: 110 $mg^2/g$) | 3 parts by weight |
| Silwet FZ-2122 (silicone surfactant; trade name of Nippon Unicar Co., Ltd.) | 0.1 part by weight |

The above compounded substance was kneaded at 60° C. for 1 hour at 0.05 atm using a planetary mixer (mentioned above) and then

| | |
|---|---|
| Diana process oil MC-W90 (mineral oil; trade name of Idemitsu Kosan Co., Ltd.) | 48.5 parts by weight |

was added thereto followed by kneading at 30° C. for 1 hour at 0.05 atm to give a product of Example 3.

EXAMPLE 4

| | |
|---|---|
| TSF451-3000 (dimethyl silicone oil; trade name of Toshiba Silicone Co., Ltd.) | 70.0 parts by weight |
| Aerozyl 200 (fine particle silica; trade name of Nippon Aerozyl Co., Ltd.) | 4.0 parts by weight |
| A 174 (silane coupling agent; trade name of Nippon Unicar Co., Ltd.) | 1.0 part by weight |

The above compounded substance was kneaded twice using a triple-roll mill to prepare gel-like substance 4A. Then,

| | |
|---|---|
| Gel-like substance 4A | 75 parts by weight |
| and | |
| TSF451-3000 | 25 parts by weight |

were weighed in a planetary mixer (mentioned above) and stirred at ambient temperature for 1 hour at 0.02 atm to prepare a product of Example 4.

EXAMPLE 5

| | |
|---|---|
| Nissan polybutene 200SH | 38.5 parts by weight |
| Benton 34 | 1 part by weight |
| Diglycerol dibehenyl ether | 0.5 part by weight |
| Ethanol | 2 parts by weight |

The above compounded substance was kneaded twice using a triple-roll mill (mentioned above) to prepare gel-like substance 5A. During the kneading in the triple-roll mill, ethanol was evaporated and lost.

| | |
|---|---|
| Diana process oil MC-S32 | 58.5 parts by weight |
| Aerozyl | 1 part by weight |
| KBM 504 | 0.5 part by weight |

The above substances were stirred for 1 hour by a bead mill of a transverse type (type KDL; manufactured by Daino Mill) using zirconia beads to prepare gel-like substance 5B.

| | |
|---|---|
| Gel-like substance 5A | 40 parts by weight |
| and | |
| Gel-like substance 5B | 60 parts by weight |

were weighed and stirred at 40° C. for 1 hour at 0.02 atm to give a product of Example 5.

EXAMPLE 6

| | |
|---|---|
| Polybutene 35R | 47.4 parts by weight |
| Diana process oil MC-S32 | 47.5 parts by weight |
| Aerozyl R-976D | 5 parts by weight |
| Eftop EF-801 | 0.1 part by weight |

The above substances were weighed, stirred at 70° C. for 1 hour using a planetary mixer (mentioned above) and stirred at 40° C. for 1 hour at 0.3 atm to give a product of Example 6.

EXAMPLE 7

| | |
|---|---|
| Nissan polybutene 015N | 95 parts by weight |
| Benton 34 | 4 parts by weight |
| KBM 504 | 1 part by weight |
| Methanol | 2 parts by weight |

The above compounded substance was kneaded twice using a triple-roll mill (mentioned above). During the kneading using the triple-roll mill, methanol was evaporated and lost. After that, the mixture was transferred to an agi-homomixer (mentioned already) and allowed to stand at 50° C. for 1 hour at 0.02 atm to give a product of Example 7.

EXAMPLE 8

| | |
|---|---|
| Nissan polybutene 200SH | 48.4 parts by weight |
| Aerozyl R-972 | 3 parts by weight |
| Silwet FZ-2122 | 0.1 part by weight |

The above compounded substance was kneaded at 60° C. for 1 hour at 0.05 atm using a planetary mixer (mentioned above), then

| | |
|---|---|
| Diana process oil MC-W90 (mineral oil; trade name of Idemitsu Kosan Co., Ltd.) | 48.5 parts by weight |

was added and the mixture was made 100° C., kneaded for 1 hours and, after that, kneaded at 100° C. for 1 hour at 0.05 atm to give a product of Example 8.

EXAMPLE 9

| | |
|---|---|
| Polybutene 35R | 47.4 parts by weight |
| Aerozyl R-976D | 5 parts by weight |
| Eftop EF-801 | 0.1 part by weight |
| Diana process oil MC-S32 | 47.5 parts by weight |

The above substances were weighed, stirred at 70° C. for 1 hour using a planetary mixer and stirred at ambient temperature for 1 hour at 0.2 atm to give a product of Example 9.

EXAMPLE 10

| | |
|---|---|
| Polybutene 35R | 47.4 parts by weight |
| Aerozyl R-976D | 5 parts by weight |
| Eftop EF-801 | 0.1 part by weight |
| Diana process oil MC-S32 | 47.5 parts by weight |

The above substances were weighed, stirred at 70° C. for 1 hour using a planetary mixer and allowed to stand at ambient temperature for 1 hour at 0.2 atm to give a product of Example 10.

EXAMPLE 11

| | |
|---|---|
| Polybutene 35R | 47.4 parts by weight |
| Aerozyl R-976D | 5 parts by weight |
| Eftop EF-801 | 0.1 part by weight |
| Diana process oil MC-S32 | 47.5 parts by weight |

The above substances were weighed, stirred at 70° C. for 1 hour using a planetary mixer and allowed to stand at 40° C. for 1 hour at 0.2 atm to give a product of Example 11.

Comparative Example 1

| | |
|---|---|
| Polybutene 35R | 47.4 parts by weight |
| Aerozyl R-976D | 5 parts by weight |
| Eftop EF-801 | 0.1 part by weight |
| Diana process oil MC-S32 | 47.5 parts by weight |

The above substances were weighed and stirred at 70° C. for 1 hour using a planetary mixer and to give a product of Comparative Example 1.

Comparative Example 2

| | |
|---|---|
| TSF451-3000 | 70.0 parts by weight |
| Aerozyl 200 | 4.0 parts by weight |
| A174 | 1.0 part by weight |

The above compounded substances were kneaded twice using a triple-roll mill to prepare gel-like substance 4A. After that,

| | |
|---|---|
| Gel-like substance 4A | 75 parts by weight |
| and | |
| TSF451-3000 | 25 parts by weight |

were weighed in a planetary mixer (mentioned above) and stirred at ambient temperature and ordinary pressure for 1 hour to give a product of Comparative Example 2.

Comparative Example 3

| | |
|---|---|
| Nissan polybutene 200SH | 38.5 parts by weight |
| Benton 34 | 1 part by weight |
| Diglycerol dibehenyl ether | 0.5 part by weight |
| Ethanol | 2 parts by weight |

The above compounded substance was kneaded twice in a triple-roll mill (mentioned above) to give gel-like product 5A. During the kneading in the triple-roll mill, ethanol was evaporated and lost.

| | |
|---|---|
| Diana process oil MC-S32 | 58.5 parts by weight |
| Aerozyl 200 | 1 part by weight |
| KBM 504 | 0.5 part by weight |

The above substances were stirred for 1 hour by a bead mill of a transverse type (mentioned above) using zirconia beads to give gel-like product 5B.

| | |
|---|---|
| Gel-like product 5A | 40 parts by weight |
| and | |
| Gel-like product 5B | 60 parts by weight |

were weighed and stirred at 40° C. for 1 hour at ordinary pressure to give a product of Comparative Example 3.

Comparative Example 4

| | |
|---|---|
| Nissan polybutene 015N | 95 parts by weight |
| Benton 34 | 4 parts by weight |
| KBM 504 | 1 part by weight |
| Methanol | 2 parts by weight |

The above compounded substance was kneaded twice in a triple-roll mill (mentioned above). During the kneading in the triple-roll mill, methanol was evaporated and lost. The mixture was then transferred to an agi-homomixer (mentioned above) and stirred at 50° C. for 1 hour at ordinary pressure to give a product of Comparative Example 4.

The products of Examples 1 to 11 and Comparative Example 1 to 4 prepared as above were classified according to negative pressure, temperature and stirring time and shown in Table 1.

TABLE 1

| | Negative Pressure (atm) | Temperature (° C.) | Stirring Time (hours) |
|---|---|---|---|
| Example 1 | 0.2 | 40 | 1 |
| Example 2 | 0.02 | 50 | 1 |
| Example 3 | 0.05 | 30 | 1 |
| Example 4 | 0.02 | ambient temp | 1 |
| Example 5 | 0.02 | 40 | 1 |
| Example 6 | 0.3 | 40 | 1 |
| Example 7 | 0.02 | 50 | — |
| Example 8 | 0.05 | 100 | kneaded (1) |
| Example 9 | 0.2 | ambient temp | 1 |
| Example 10 | 0.2 | ambient temp | — |
| Example 11 | 0.2 | 40 | — |
| Comp. Ex. 1 | ordinary pressure | ambient temp | — |
| Comp. Ex. 2 | ordinary pressure | ambient temp | 1 |
| Comp. Ex. 3 | ordinary pressure | 40 | 1 |
| Comp. Ex. 4 | ordinary pressure | 50 | 1 |

Result of the evaluation according to Tests 1–5 for the products of Examples 1–11 and Comparative Examples 1–4 is shown in Table 2.

TABLE 2

| | Test 1 | Test 2 | Test 3 | Test 4 | Test 5 |
|---|---|---|---|---|---|
| Example 1 | 120 | 6 | 2 | 0 | 0 |
| Example 2 | 112 | 0 | 0 | 0 | 0 |
| Example 3 | 105 | 0 | 0 | 0 | 0 |
| Example 4 | 107 | 0 | 0 | 0 | 0 |
| Example 5 | 105 | 0 | 0 | 0 | 0 |
| Example 6 | 164 | 11 | 6 | 10 | 2 |
| Example 7 | 168 | 4 | 0 | 6 | 0 |
| Example 8 | 252 | 0 | 0 | 0 | 0 |
| Example 9 | 171 | 12 | 6 | 10 | 2 |
| Example 10 | 185 | 15 | 10 | 15 | 5 |
| Example 11 | 160 | 9 | 5 | 8 | 2 |
| Comp. Ex. 1 | 320 | 21 | 19 | 41 | 7 |
| Comp. Ex. 2 | 305 | 5 | 0 | 18 | 5 |
| Comp. Ex. 3 | 134 | 12 | 2 | 11 | 0 |
| Comp. Ex. 4 | 203 | 12 | 6 | 31 | 2 |

In this evaluation, it goes without saying that the evaluation varied according to the compound and, therefore, the types of ink follower having the same compound were successively evaluated.

Now, at first, consideration will be carried out for the products of Example 1, Examples 9–11, Comparative Example 1 and Example 6.

All of them are ink follower having the same compound and the only difference among them is that whether or not depressurization, etc. were carried out in the manufacturing steps.

Incidentally, Comparative Example 1 is the case where depressurization, temperature control and stirring were not carried out at all. On the contrary, in Example 10, only depressurization was carried out. Even in the case where only depressurization was carried out as in Example 10, far higher evaluation was resulted as compared with Comparative Example 1.

Further, when stirring at ambient temperature was carried out together with depressurization as in Example 9 or, when depressurization was carried out at the temperature of 40° C. as in Example 11, the evaluation became higher as compared with Example 10.

In addition, when depressurization, temperature control and stirring were carried out at the same time as in Example 1, far better characteristics were achieved.

It has been thereby found that depressurization is very effective means, that each of stirring and temperature raising during depressurization is effective and that, when stirring and temperature raising are carried out at the same time together with depressurization, far better synergistic characteristics are achieved as compared with the case where they are carried out separately.

Furthermore, in Example 1 and Example 6, only the negative condition is different. Thus, in Example 1, debubbling is carried out at the negative pressure of 0.2 atm while, in Example 6, debubbling is carried out at the negative pressure of 0.3 atm.

The result is that, as shown in Table 2, Example 1 had far better evaluation than Example 6. In order to ascertain this meaning, the same experiments as in Examples 9–11 were carried out at the negative pressure of 0.3 atm whereupon the result was that, as well as in the relation between Example 1 and Example 6, the result of the experiment carried out at 0.3 atm showed lower evaluation as compared with the case of 0.2 atm.

It has now been confirmed that, when debubbling was carried out at a negative pressure as in the present invention, the effect becomes higher when the negative pressure was made 0.2 atm or lower.

Now, Example 2, Example 7 and Comparative Example 4 will be explained.

All of them are ink follower having the same compound and the only difference among them is that whether or not stirring or depressurization, etc. were carried out in the manufacturing steps.

Incidentally, Comparative Example 4 is the case where, although stirring was carried out at 50° C. for 1 hour, the pressure was ordinary. On the contrary, in Example 7, although stirring was not carried out, the condition was at 50° C. and 0.02 atm while, in Example 2, stirring was carried out for 1 hour at 50° C. and 0.02 atm.

When the result is investigated according to Table 2, evaluation of Comparative Example 4 where heating and stirring were conducted at ordinary pressure was lower.

On the other hand, in Example 7 where no stirring was carried out but heated with depressurization, the evaluation was far better than Comparative Example 4.

Further, in Example 2 where siting was carried out with heating and depressurization, the evaluation was far better than in Example 7.

From those results, it has been confirmed that, in ink follower having the composition of Example 2 where the negative pressure is made 0.02 atm, depressurization more contributes to an improvement in characteristics than stirring.

Now, Example 4 and Comparative Example 2 will be explained.

They are the ink follower having the same compound and the only difference between the two is that whether or not the depressurization, etc. are carried out in the manufacturing steps.

Although stirring at ambient temperature was carried out in those two examples, it was conducted at 0.02 atm in Example 4 while, in Comparative Example 2, it was conducted at ordinary pressure.

From the result, it has been noted that, when stirring is carried out at ambient temperature, a big difference is noted in their characteristics between the cases when depressurization to an extent of 0.02 atm is carried out and not.

Now, Example 5 and Comparative Example 3 will be explained as hereunder.

Both of them are ink follower having the same compound and the only difference between the two is that whether or not the depressurization was carried out in the manufacturing steps.

In both of the two examples, stirring was carried out at 40° C. and it was carried out under depressurization to an extent of 0.02 atm in Example 5 while, in Comparative Example 3, it was carried out at ordinary pressure.

The result was the same as in the case of comparison of Example 4 with Comparative Example 2 as mentioned above that, even in the case of stirring at 40° C., a big difference was noted in the characteristics between the case where depressurization was carried out to an extent of 0.02 atm and not.

Example 7 and Comparative Example 4 will now be explained as hereunder.

They are the ink follower having the same compound and the only difference between the two was that, in the manufacturing steps, whether or not depressurization, etc. were carried out or whether or not stirring was carried out.

In Example 7, heating and depressurization were carried out while, in Comparative Example 4, heating and stirring were carried out.

As shown in Table 2, it was found from the result that, when heating was carried out at the same temperature, the case where depressurization was carried out gave improved characteristics than the case where stirring was carried out.

Example 3 and Example 8 are the ink follower having the same compound but Example 3 is the case where stirring was carried out at 30° C. for one hour while Example 8 is the case where kneading was carried out at 100° C. for one hour.

When they were compared, both were highly evaluated for Test 2 to Test 5 while, for Test 1, Example 3 showed higher evaluation.

In Example 8 as such, since depressurization was carried out at the temperature of as high as 100° C., components having relatively high volatility in the substrate oil were lost and, accordingly, the evaluation for Test 1 was low.

According to the experiences by the present inventors, more influence was noted on the property by the difference in viscosity due to the difference in the efficacy in the dispersing agent than by the difference in viscosity of the ink follower due to the viscosity of the substrate oil. The difference in the property resulted due to the difference in viscosity of the substrate oil upon filling in a ballpoint pen holder is very import as the property as a ballpoint pen such as a following property to ink, a flowing-out of ink, a resistance to shock by falling-down, etc. Thus, even when the result in Test 2 to Test 5 is good, the dispersion in viscosity as noted in Example 8 is to be avoided.

Originally, in the present invention, generation of bubbles in a ballpoint pen holder as mentioned in Test 4 is taken up as a problem and an object is to improve that.

Consequently, the result of Test 4 will now be re-evaluated.

When Comparative Example 1 is taken as a standard, the presence of bubbles or cracks became to about one-third of that in Example 10 where negative pressure is applied and, in Example 9 where stirring was carried out at the same time, the presence of bubbles or bubbles or cracks became to about one-fourth. Further, in Example 11 where a negative pressure was applied in a heated state, the presence of bubbles or cracks became to about one-fifth.

From those, it has been confirmed that, in order to eliminate the fine bubbles in the thickener, formation of a negative pressure environment in the manufacturing steps is effective.

As compared with Example 1, all of compound, temperature and degree of depressurization were same in Example 11 but no stirring was carried out in Example 11 whereby the bubbles swollen in vacuo were not broken but returned into the ink follower upon adjusting the ordinary pressure and, as a result, debubbling did not sufficiently take place as compared with Example 1.

However, as compared with Comparative Example 1, the debubbling effect due to negative pressure was able to be well confirmed.

As such, the debubbling effect under the condition whether or not the stirring was carried out was able to be confirmed by comparing Example 2 with Example 7.

When the ink follower was judged based upon the result of Test 4 as such, the debubbling effect due to negative pressure was confirmed and, in addition, further improved effect due to heating or stirring at the same time was confirmed as well.

It was also confirmed as a result of comparison of Example 1 with Example 6 that, when the pressure for resulting in the negative pressure was 0.2 atm or lower, the effect was significantly improved. Thus, it has been confirmed that, in resulting in a negative pressure, there is a boundary at 0.2 atm. The reason why the result of Test 2 and Test 3 was improved as well is presumed to be due to the fact that fine bubbles in the thickener are eliminated and the thickener is well wetted by the substrate oil whereby the dispersing ability is improved.

Incidentally, although there is no step for debubbling under depressurization in Comparative Example 3, the gel-like substances prepared by a triple-roll mill and a bead mill are mixed. Since any of those dispersing devices is such a one where bubbles are hardly mixed therein, dispersion in the viscosity is relatively small and a relatively high evaluation is achieved.

Now the invention concerning claims 19 to 21 will be further explained by means of Examples and Comparative Examples.

In the Examples and the Comparative Examples, the following types of ink follower were used. Ink Follower A:

| | |
|---|---|
| Nissan polybutene 015N (trade name of NOF Corporation; MW = 580) | 95 parts by weight |
| Benton 34 (organically treated bentonite; trade name of Wilber-Ellis) | 4 parts by weight |
| Nikkol CO-3 (polyoxyethylene castor oil; trade name of Nikko Chemical Co., Ltd.) | 1 part by weight |
| Methanol | 2 parts by weight |

The above compounded substance was kneaded twice using a triple-roll mill to prepare ink follower A. During the kneading by the triple-roll mill, methanol was evaporated and lost. Ink Follower B:

| | |
|---|---|
| TSF 451-3000 (dimethyl silicone oil; trade name of Toshiba Silicone) | 70.0 parts by weight |
| Aerozyl 200 | 4.0 parts by weight |
| A 174 (silane coupling agent; trade name by Nippon Unicar) | 1.0 part by weight |

The above compounded substance was kneaded twice using a triple-roll mill to prepare gel-like substance A. After that,

| | |
|---|---|
| Gel-like substance A and | 75 parts by weight |
| TSF 451-3000 | 25 parts by weight |

were weighed in a planetary mixer (type 5 MV; manufactured by Dalton Co., Ltd.) and stirred for one hour to give ink follower B.

In Examples and Comparative Examples, the H-103N manufactured by Kokusan Enshinki Co., Ltd. (effective orbit radius: 15.0 cm) was used.

In the Examples and the Comparative Examples, ballpoint pens were manufactured using the following ink.

Ink for the Test

| | |
|---|---|
| Printex 25 (carbon black; trade name of Degussa) | 7 parts by weight |
| PVP K-30 (polyvinylpyrrolidone; manufactured by GAF) | 3.5 parts by weight |
| Glycerol | 10 parts by weight |
| Potassium ricinolate | 0.5 part by weight |
| Triethanolamine | 1 part by weight |
| 1,2-Benzisothiazolin-3-one | 0.2 part by weight |
| Benzotriazole | 0.2 part by weight |
| Water | 27.2 parts by weight |

The above substances were kneaded using a bead mill and, after that, coarse particles of carbon black were removed and then

| | |
|---|---|
| Propylene glycol | 20 parts by weight |
| Carbopol 940 (polyacrylic acid of a cross-linked type; trade name of B.F. Goodrich) and | 0.4 part by weight |
| Water | 30 parts by weight |

were added thereto to prepare the ink for water-base ballpoint pens.

In the Examples and the Comparative Examples, ballpoint pens as shown in FIG. 1 were assembled.

A semi-transparent polypropylene tube having an inner diameter of 4.0 mm was used as an ink reservoir (10), the above-prepared ink for the test was used as an ink (20) and the ink (20) was charged thereinto so as to make the distance from the rear end of the ink (20) from the pen point part (40) 10 cm. The above-mentioned ink follower (A) or (B) was used as ink follower (30) and the ink follower was charged thereinto to an extent of 20 mm so as to make the distance from its center to the pen point part (40) 11 cm. The pen point part (40) was equipped with a ballpoint pen tip which was the same as that for a commercially available ballpoint pen (UM-100; trade name of Mitsubishi Pencil Co., Ltd.) having the same shape as shown in FIG. 1. Material for the ballpoint pen tip holder (41) is free-cutting stainless steel while that for the ball (42) is tungsten carbide having a diameter of 0.5 mm.

In evaluating the products of the Examples and the Comparative Examples, 50 ballpoint pens were assembled for each Example or Comparative Example and, as Test 1, numbers of the ballpoint pen where significant deformation or damage was resulted due to too strong centrifugation or where writing test was inferior were counted. In the writing test, the case where a circle having a circumference of about 10 cm was continuously drawn for 3 to 4 times and a good line was written was defined to pass the test.

Ballpoint pens which were lost by damage or the like were supplemented by reassembling and then 50 pens for each Example or Comparative Example were allowed to stand in an upward direction in a water bath of 35° C. for three months. After that, numbers of the pens where bubbles were found in the ink or at the interface of ink/ink follower were counted as Test 2 while, as Test 3, numbers of the pens where bubbles were found in the ink follower were counted. In all of the Tests 1–3, it is preferred when there is no such a ballpoint pen and, accordingly, the less numbers mean the more preferable results.

When ink follower was centrifuged solely, the ink follower was supplemented to a centrifugal precipitation tube to an extent of 4 cm from the bottom. With regard to the centrifugal force applied to the ink follower, its average is at the position of the center of gravity of the ink follower and, therefore, the force was calculated at the position of 2 cm from the bottom of the centrifugal precipitation tube or, in other words, at a radius of gyration of 14 cm.

EXAMPLE 12

Debubbling Step of Ink Follower

Ink follower: Ink follower A

Gravitational acceleration: 207·g

Centrifugation time: 10 minutes

Debubbling Step upon Assembling the Ballpoint Pen

Gravitational acceleration at the tip: 378·g

Gravitational acceleration of ink follower: 101·g

Centrifugation time: 10 minutes

EXAMPLE 13

Debubbling Step of Ink Follower

Ink follower: Ink follower B

Gravitational acceleration: 352·g

Centrifugation time: 10 minutes

Debubbling Step upon Assembling the Ballpoint Pen

Gravitational acceleration at the tip: 378·g

Gravitational acceleration of ink follower: 101·g

Centrifugation time: 10 minutes

EXAMPLE 14

Debubbling Step of Ink Follower

Ink follower: Ink follower 2

Revolutions of Centrifuge: 2150 rpm

Gravitational acceleration: 724·g

Centrifugation time: 10 minutes

Debubbling Step upon Assembling the Ballpoint Pen

Gravitational acceleration at the tip: 378·g

Gravitational acceleration of ink follower: 101·g

Centrifugation time: 10 minutes

EXAMPLE 15

Debubbling Step of Ink Follower

Ink follower: Ink follower 1

Gravitational acceleration: 207·g

Centrifugation time: 24 hours

Debubbling Step upon Assembling the Ballpoint Pen

Gravitational acceleration at the tip: 378·g

Gravitational acceleration of ink follower: 101·g

Centrifugation time: 10 minutes

Comparative Example 5

Debubbling Step of Ink Follower

Ink follower: Ink follower 1

Gravitational acceleration: –

Centrifugation time: 0 minutes

Debubbling Step upon Assembling the Ballpoint Pen

Gravitational acceleration at the tip: 378·g

Gravitational acceleration of ink follower: 101·g

Centrifugation time: 10 minutes

Comparative Example 6

Debubbling Step of Ink Follower

Ink follower: Ink follower 1

Gravitational acceleration: –

Centrifugation time: 0 minute

Debubbling Step upon Assembling the Ballpoint Pen

Gravitational acceleration at the tip: 671·g

Gravitational acceleration of ink follower: 179·g

Centrifugal time: 10 minutes

Comparative Example 7

Debubbling Step of Ink Follower

Ink follower: Ink follower 2

Gravitational acceleration: –

Centrifugation time: 0 minute

Debubbling Step upon Assembling the Ballpoint Pen

Gravitational acceleration at the tip: 2686·g

Gravitational acceleration of ink follower: 716·g

Centrifugation time: 10 minutes

Comparative Example 8

Debubbling Step of Ink Follower

Ink follower: Ink follower 1

Gravitational acceleration: 157·g

Centrifugation time: 10 minutes

Debubbling Step upon Assembling the Ballpoint Pen

Gravitational acceleration at the tip: 378·g

Gravitational acceleration of ink follower: 101·g

Centrifugation time: 10 minutes

Comparative Example 9

Debubbling Step of Ink Follower

Ink follower: Ink follower 1

Gravitational acceleration: 157·g

Centrifugation time: 120 minutes

Debubbling Step upon Assembling the Ballpoint Pen

Gravitational acceleration at the tip: 378·g

Gravitational acceleration of ink follower: 101·g

Centrifugation time: 10 minutes

In each of the above-mentioned Examples 12–15 and Comparative Examples 5–9, the fact whether or not a previous debubbling was carried out, gravitational acceleration at that stage, gravitational acceleration upon debubbling after assembling, and gravitational acceleration applied to the ink follower were summarized and are shown in Table 3.

In this Table 3, the unit "g" stands for gravitational acceleration. Previous debubbling for Example 15 was carried out for 24 hours and that for Comparative Example 9 was carried out for 2 hours while that for all others was carried out for 10 minutes. The letter A or B in the column of "Follower" is the type of the ink follower used.

TABLE 3

| | Previous Debubbling | Debubbling after Assembling | | |
|---|---|---|---|---|
| | (g) | Tip (g) | Follower (g) | Follower |
| Examples 12 | 207 | 378 | 101 | A |
| Examples 13 | 352 | 378 | 101 | B |
| Examples 14 | 724 | 378 | 101 | B |
| Examples 15 | 207(24 hrs) | 378 | 101 | A |
| Comparative Examples 5 | — | 378 | 101 | A |
| Comparative Examples 6 | — | 671 | 179 | A |
| Comparative Examples 7 | — | 2686 | 716 | B |
| Comparative Examples 8 | 157 | 378 | 101 | A |
| Comparative Examples 9 | 157(24 hrs) | 378 | 101 | A |

Further, the evaluation concerning Tests 1, 2 and 3 for each of the products of Examples 12–15 and Comparative Examples 5–9 is shown in Table 4.

TABLE 4

| | Test 1 | Test 2 | Test 3 |
|---|---|---|---|
| Example 12 | 0 | 8 | 1 |
| Example 13 | 0 | 3 | 0 |
| Example 14 | 0 | 0 | 0 |
| Example 15 | 0 | 4 | 0 |
| Comparative Example 5 | 0 | 50 | 35 |
| Comparative Example 6 | 0 | 15 | 9 |
| Comparative Example 7 | 32 | 0 | 0 |
| Comparative Example 8 | 0 | 17 | 11 |
| Comparative Example 9 | 0 | 15 | 10 |

When Examples 12–15 and Comparative Examples 5–9 are compared, it is understood that the property of the ink follower manufactured by the method of the present invention is evidently better.

Now, with a presumption that the evaluation of ink follower varies depending upon its compound, Examples 12 and 15 and Comparative Examples 5, 6, 8 and 9 using ink follower A will be firstly investigated.

Example 12 and Comparative Example 5 are in the same compound and the only exception is that whether or not previous debubbling is carried.

First, when Comparative Example 12 was checked, it was noted that, according to the debubbling after assembling to such an extent, bubbles generated in ink follower of Test 3 were noted in 70% of the assembled ballpoint pens and, in the ink or at the interface between the ink and the ink follower, bubbles were noted in all of the ballpoint pens.

On the contrary, in Example 1 in which previous debubbling was carried out only for the ink follower, the case where bubbles were generated in the ink follower was only one (2%) and the case where bubbles were generated in the ink or at the interface between the ink and the ink follower was 8 (16%) resulting in a significant improvement.

In Comparative Example 13, debubbling was carried out after assembling and, as compared with Example 12, a gravitational acceleration of about 70% higher was applied.

As shown in Table 2, even when debubbling after assembling was carried out by means of a gravitational acceleration to an extent as above, the evaluation for Example 12 in which previous debubbling was higher.

Further, in Comparative Example 15, although previous debubbling was carried out, that was done by a centrifugal force of 157·g which was lower than 200·g. The evaluation in that case was worse than that in Comparative Example 6 as mentioned above.

From those facts, it has been found that, although previous debubbling is necessary, effect of removal of fine bubbles is not achieved unless the previous debubbling is carried out by a centrifugal force of 200·g or higher.

In Comparative Example 9, previous debubbling by means of a centrifugal force to the same extent as that in Comparative Example 8 was carried out for 2 hours but the result was that, although better than Comparative Example 8, it was almost the same as in Comparative Example 6.

In Example 15, the compound is the same as that in Example 12 and previous debubbling is carried out by the same centrifugal force as in Example 12 but there is a difference that, unlike in Example 12 where previous debubbling is carried out for 10 minutes, that for 24 hours is carried out.

In the above cases, Example 15 shows higher evaluation than Example 12. This is because, in the case of application of centrifugal force of more than 200·g, removal of fine bubbles is available by applying a centrifugal force for a long period. With this respect, the result is reversed as compared with Comparative Example 9.

From such a result, it may be concluded that, with regard to previous debubbling, the evaluation depends upon the strength of the centrifugal force for the previous debubbling regardless of the time.

As a result, it has been found that, independently of the time for applying the centrifugal force, 200·g or higher centrifugal force is required.

Now, consideration will be made for Examples 13 and 14 and Comparative Example 7 where ink follower B is used. In Example 13, a previous debubbling was carried out by a centrifugal force of 352·g which was higher than that in Example 12 whereupon a far higher evaluation than Example 12 was achieved.

When other experiments were carried out keeping the above in mind, it was found that the effect of the previous debubbling was far improved when the centrifugal force was higher than 350·g.

Next, in Example 14, previous debubbling was carried out at a far higher centrifugal force of 724·g whereupon bubbles were not generated even in the ink follower and, in addition, there was no case where bubbles were generated in the ink or at the interface between the ink and the ink follower.

Again, the centrifugal force was determined where bubbles were not generated in the ink follower and also both in the ink and at the interface between the ink and the ink follower whereupon it was confirmed that, when the centrifugal force exceeded 700·g, generation of bubbles did not take place.

Then, as in Comparative Example 8, an assembly was carried out so as to apply a centrifugal force of 716·g to the ink follower and then only debubbling was conducted. As a result, bubbles were no longer generated in the ink follower, in the ink, and at the interface between the ink and the ink follower. However, at the area where the pen point (40) and the ink reservoir (10) were connected as shown in FIG. 1, breakage was found in many cases and there were many inferior writings as well. The total numbers of such a breakage and inferior writing reached as high as 64%.

That was caused by the fact that, when too strong centrifugal force was applied to pen point in applying a centrifugal force upon assembling the ballpoint pen, the ballpoint pen was damaged.

Of course, there is no inconvenience of damage of ballpoint pens when a centrifugal force was applied only to the ink follower as in Example 13.

Thus, the result of the experiment showed that, although application of a centrifugal force of 700·g or higher to the ink follower was found to be necessary in order to completely remove the bubbles, it was not possible to apply such a centrifugal force after the ballpoint pen was assembled because of damage or inferior writing of the ballpoint pen. However, if debubbling is carried out only for ink follower as in the present invention, a complete removal of bubbles is able to be available without bad influence to ballpoint pens.

When each of Examples and Comparative Examples is further investigated as above, debubbling by a centrifugal force of higher than 200·g is necessary for achieving a certain effect in a previous debubbling.

It has been further found that, when previous debubbling is carried out by a centrifugal force of higher than 350·g, the evaluation was significantly better and that, when a centrifugal force is higher than 700·g, generation of bubbles does not take place.

As fully illustrated hereinabove, ink follower for a water-base ballpoint pen in accordance with the present invention is excellent ink follower having little lot-to-lot difference, time-dependent stability and no bad affection to the ink. In addition, in the present invention, ink follower for water-base ballpoint pens is previously subjected to a centrifugal debubbling during its manufacture whereupon, even when a centrifugal debubbling which is common or rather essential in assembling the ballpoint pens is not made so strong, it is now possible to very highly remove the invisible fine bubbles contained in particulate silica and clay thickener even in a microscopic view and, further, there is no bad affection to the writing property of the pen.

Industrial Applicability

As mentioned above, ink follower for a water-base ballpoint pen and a method for manufacturing the same in accordance with the present invention can be utilized for the manufacture of ink follower used at the tail end of the ink for a water-base ballpoint pent filled in an ink reservoir of a water-base ballpoint pen.

What is claimed is:

1. Ink follower for a water-base ballpoint pen where ink is directly filled in an ink reservoir, said ink follower comprising a base oil and a thickener dispersed in the base oil and which is intentionally exposed to a negative atmospheric pressure after addition of thickener previously before the assembly of the ballpoint pen.

2. Ink follower for a water-base ballpoint pen according to claim 1, where the negative pressure is 0.2 atm or lower.

3. Ink follower for a water-base ballpoint pen according to claim 1, where the temperature is raised to higher than ambient temperature under the negative pressure.

4. Ink follower for a water-base ballpoint pen according to claim 2, where the temperature is raised to higher than ambient temperature under the negative pressure.

5. Ink follower for a water-base ballpoint pen according to claim 1, where stirring is carried out under the negative pressure.

6. Ink follower for a water-base ballpoint pen according to claim 2, where stirring is carried out under the negative pressure.

7. Ink follower for a water-base ballpoint pen according to claim 3, where stirring is carried out under the negative pressure.

8. Ink follower for a water-base ballpoint pen according to claim 4, where stirring is carried out under the negative pressure.

9. Ink follower for a water-base ballpoint pen according to claim 1, where at least either organically treated clay or particulate silica is used as the thickener.

10. Ink follower for a water-base ballpoint pen according to claim 2, where at least either organically treated clay or particulate silica is used as the thickener.

11. Ink follower for a water-base ballpoint pen according to claim 3, where at least either organically treated clay or particulate silica is used as the thickener.

12. Ink follower for a water-base ballpoint pen according to claim 4, where at least either organically treated clay or particulate silica is used as the thickener.

13. Ink follower for a water-base ballpoint pen according to claim 5, where at least either organically treated clay or particulate silica is used as the thickener.

14. Ink follower for a water-base ballpoint pen according to claim 6, where at least either organically treated clay or particulate silica is used as the thickener.

15. Ink follower for a water-base ballpoint pen according to claim 7, where at least either organically treated clay or particulate silica is used as the thickener.

16. Ink follower for a water-base ballpoint pen according to claim 8, where at least either organically treated clay or particulate silica is used as the thickener.

17. A method for manufacturing an ink follower for a water-base ballpoint pen, said ink follower comprising a base oil and a thickener dispersed in the base oil; where, under a reduced pressure of 0.2 atm or lower after addition of thickener, bubbles which have been contaminated with or in the thickener and are swollen by the reduced pressure are eliminated by heating and stirring.

18. A method for manufacturing ink follower for a water-base ballpoint pen according to claim 17, where at least either organically treated clay or particulate silica is used as the thickener.

19. A method for manufacturing an ink follower for a water-base ballpoint pen having pseudo-plasticity, said ink follower comprising a base oil and a thickener dispersed in the base oil; where the ink follower is debubbled by a centrifugal force greater than or equal to 200-fold of gravitational force.

20. A method for manufacturing an ink follower for a water-base ballpoint pen having pseudo-plasticity, said ink follower comprising a base oil and an thickener dispersed in the base oil; where the ink follower is debubbled by a centrifugal force greater than or equal to 350-fold of gravitational force.

21. A method for manufacturing an ink follower for a water-base ballpoint pen having pseudo-plasticity, said ink follower comprising a base oil and an thickener dispersed in the base oil; where the ink follower is debubbled by a centrifugal force greater than or equal to 700-fold of gravitational force.

* * * * *